US009044727B2

(12) United States Patent
Kulprathipanja et al.

(10) Patent No.: US 9,044,727 B2
(45) Date of Patent: *Jun. 2, 2015

(54) APPARATUSES AND METHODS FOR CONTROLLING HEAT FOR RAPID THERMAL PROCESSING OF CARBONACEOUS MATERIAL

(75) Inventors: Sathit Kulprathipanja, Schaumburg, IL (US); Paolo Palmas, Des Plaines, IL (US)

(73) Assignee: Ensyn Renewables, Inc., Wilmington, DE (US)

( * ) Notice: Subject to any disclaimer, the term of this patent is extended or adjusted under 35 U.S.C. 154(b) by 822 days.

This patent is subject to a terminal disclaimer.

(21) Appl. No.: 13/240,570

(22) Filed: Sep. 22, 2011

(65) Prior Publication Data

US 2013/0075072 A1     Mar. 28, 2013

(51) Int. Cl.
*C10B 51/00*     (2006.01)
*B01J 19/00*     (2006.01)
(Continued)

(52) U.S. Cl.
CPC . *B01J 19/00* (2013.01); *F28F 7/00* (2013.01); *B01J 8/1836* (2013.01); *B01J 8/26* (2013.01);
(Continued)

(58) Field of Classification Search
CPC . B01J 19/00; B01J 2208/00194; C10B 49/22; C10B 49/00; C10B 53/07; C10B 53/08; F23G 2201/304; F23G 2203/502; F23G 2209/26; Y02E 50/131
USPC .................. 422/146, 147; 202/121; 110/344; 585/240; 201/13, 21, 31, 39
See application file for complete search history.

(56) References Cited

U.S. PATENT DOCUMENTS 1,252,072 A     1/1918   Abbot
2,205,757 A     6/1940   Wheat
(Continued)

FOREIGN PATENT DOCUMENTS

BR     8304158     7/1984
BR     8304794     4/1985
(Continued)

OTHER PUBLICATIONS

Masoumifard, N., et al., "Investigation of heat transfer between a horizontal tube and gas-solid fluidized bed", International Journal of Heat and Fluid Flow, vol. 29, No. 5, Oct. 2008, pp. 1504-1511.
(Continued)

*Primary Examiner* — Nina Bhat
(74) *Attorney, Agent, or Firm* — Jones Day

(57) ABSTRACT

Embodiments of apparatuses and methods for controlling heat for rapid thermal processing of carbonaceous material are provided herein. The apparatus comprises a reheater for containing a fluidized bubbling bed comprising an oxygen-containing gas, inorganic heat carrier particles, and char and for burning the char into ash to form heated inorganic particles. An inorganic particle cooler is in fluid communication with the reheater to receive a first portion of the heated inorganic particles. The inorganic particle cooler is configured to receive a cooling medium for indirect heat exchange with the first portion of the heated inorganic particles to form first partially-cooled heated inorganic particles that are fluidly communicated to the reheater and combined with a second portion of the heated inorganic particles to form second partially-cooled heated inorganic particles. A reactor is in fluid communication with the reheater to receive the second partially-cooled heated inorganic particles.

20 Claims, 3 Drawing Sheets

(51) Int. Cl.

| | | |
|---|---|---|
| *F28F 7/00* | (2006.01) | |
| *B01J 8/18* | (2006.01) | |
| *B01J 8/26* | (2006.01) | |
| *B01J 8/32* | (2006.01) | |
| *B01J 8/00* | (2006.01) | |
| *C10B 49/22* | (2006.01) | |
| *C10B 53/02* | (2006.01) | |
| *F28D 7/16* | (2006.01) | |
| *F28F 1/14* | (2006.01) | |
| *C10C 5/00* | (2006.01) | |

(52) U.S. Cl.
CPC *B01J 8/32* (2013.01); *B01J 8/0055* (2013.01); *C10B 49/22* (2013.01); *C10B 53/02* (2013.01); *C10C 5/00* (2013.01); *B01J 2208/00176* (2013.01); *B01J 2208/00194* (2013.01); *B01J 2208/00292* (2013.01); *B01J 2208/00513* (2013.01); *Y02E 50/14* (2013.01); *F28D 7/1615* (2013.01); *F28F 1/14* (2013.01); *F23G 2201/304* (2013.01); *F23G 2203/502* (2013.01); *F23G 2209/26* (2013.01)

(56) References Cited

U.S. PATENT DOCUMENTS

| | | |
|---|---|---|
| 2,326,525 A | 8/1943 | Diwoky |
| 2,328,202 A | 8/1943 | Doerner |
| 2,380,098 A | 7/1945 | Doerner |
| 2,566,353 A | 9/1951 | Mills |
| 2,884,303 A | 4/1959 | William |
| 3,130,007 A | 4/1964 | Breck |
| 3,309,356 A | 3/1967 | Esterer |
| 3,313,726 A | 4/1967 | Campbell et al. |
| 3,445,549 A | 5/1969 | Hakulin |
| 3,467,502 A | 9/1969 | Davis |
| 3,694,346 A | 9/1972 | Blaser et al. |
| 3,696,022 A | 10/1972 | Hutchings |
| 3,776,533 A | 12/1973 | Vlnaty |
| 3,814,176 A | 6/1974 | Seth |
| 3,853,498 A | 12/1974 | Bailie |
| 3,876,533 A | 4/1975 | Myers |
| 3,890,111 A | 6/1975 | Knudsen |
| 3,907,661 A | 9/1975 | Gwyn et al. |
| 3,925,024 A | 12/1975 | Hollingsworth et al. |
| 3,927,996 A | 12/1975 | Knudsen et al. |
| 3,959,420 A | 5/1976 | Geddes et al. |
| 4,003,829 A | 1/1977 | Burger et al. |
| 4,039,290 A | 8/1977 | Inada et al. |
| 4,052,265 A | 10/1977 | Kemp |
| 4,064,018 A | 12/1977 | Choi |
| 4,064,043 A | 12/1977 | Kollman |
| 4,085,030 A | 4/1978 | Green et al. |
| 4,101,414 A | 7/1978 | Kim et al. |
| 4,102,773 A | 7/1978 | Green et al. |
| 4,103,902 A | 8/1978 | Steiner et al. |
| 4,138,020 A | 2/1979 | Steiner et al. |
| 4,145,274 A | 3/1979 | Green et al. |
| 4,153,514 A | 5/1979 | Garrett et al. |
| 4,157,245 A | 6/1979 | Mitchell et al. |
| 4,204,915 A | 5/1980 | Kurata et al. |
| 4,219,537 A | 8/1980 | Steiner |
| 4,225,415 A | 9/1980 | Mirza et al. |
| 4,233,119 A | 11/1980 | Meyers et al. |
| 4,245,693 A | 1/1981 | Cheng |
| 4,272,402 A | 6/1981 | Mayes |
| 4,284,616 A | 8/1981 | Solbakken et al. |
| 4,298,453 A | 11/1981 | Schoennagel et al. |
| 4,300,009 A | 11/1981 | Haag et al. |
| 4,301,771 A | 11/1981 | Jukkola et al. |
| 4,306,619 A | 12/1981 | Trojani |
| 4,308,411 A | 12/1981 | Frankiewicz |
| 4,311,670 A | 1/1982 | Nieminen et al. |
| 4,321,096 A | 3/1982 | Dobbin |
| 4,324,637 A | 4/1982 | Durai-swamy |
| 4,324,641 A | 4/1982 | Durai-Swamy |
| 4,324,642 A | 4/1982 | Durai-swamy |
| 4,324,644 A | 4/1982 | Durai-swamy |
| 4,325,327 A | 4/1982 | Kantesaria et al. |
| 4,334,893 A | 6/1982 | Lang |
| 4,336,128 A | 6/1982 | Tamm |
| 4,341,598 A | 7/1982 | Green |
| 4,344,770 A | 8/1982 | Capener et al. |
| 4,364,796 A | 12/1982 | Ishii et al. |
| 4,373,994 A | 2/1983 | Lee |
| 4,415,434 A | 11/1983 | Hargreaves et al. |
| 4,422,927 A | 12/1983 | Kowalczyk et al. |
| 4,434,726 A | 3/1984 | Jones |
| 4,443,229 A | 4/1984 | Sageman et al. |
| 4,456,504 A | 6/1984 | Spars et al. |
| 4,495,056 A | 1/1985 | Venardos et al. |
| 4,504,379 A | 3/1985 | Stuntz et al. |
| 4,548,615 A | 10/1985 | Longchamp et al. |
| 4,552,203 A | 11/1985 | Chrysostome et al. |
| 4,574,743 A | 3/1986 | Claus |
| 4,584,947 A | 4/1986 | Chittick |
| 4,595,567 A | 6/1986 | Hedrick |
| 4,615,870 A | 10/1986 | Armstrong et al. |
| 4,617,693 A | 10/1986 | Meyers et al. |
| 4,645,568 A | 2/1987 | Kurps et al. |
| 4,668,243 A | 5/1987 | Schulz |
| 4,678,860 A | 7/1987 | Kuester |
| 4,684,375 A | 8/1987 | Morin et al. |
| 4,710,357 A | 12/1987 | Cetinkaya et al. |
| 4,714,109 A | 12/1987 | Tsao |
| 4,732,091 A | 3/1988 | Gould |
| 4,823,712 A | 4/1989 | Wormer |
| 4,849,091 A | 7/1989 | Cabrera et al. |
| 4,880,473 A | 11/1989 | Scott et al. |
| 4,881,592 A | 11/1989 | Cetinkaya |
| 4,891,459 A | 1/1990 | Knight et al. |
| 4,897,178 A | 1/1990 | Best et al. |
| 4,931,171 A | 6/1990 | Piotter |
| 4,940,007 A | 7/1990 | Hiltunen et al. |
| 4,942,269 A | 7/1990 | Chum et al. |
| 4,968,325 A | 11/1990 | Black et al. |
| 4,983,278 A | 1/1991 | Cha et al. |
| 4,987,178 A | 1/1991 | Shibata et al. |
| 4,988,430 A | 1/1991 | Sechrist et al. |
| 5,009,770 A | 4/1991 | Miller et al. |
| 5,011,592 A | 4/1991 | Owen et al. |
| 5,018,458 A | 5/1991 | Mcintyre et al. |
| 5,041,209 A | 8/1991 | Cha et al. |
| 5,059,404 A | 10/1991 | Mansour et al. |
| 5,077,252 A | 12/1991 | Owen et al. |
| 5,093,085 A | 3/1992 | Engstrom et al. |
| 5,136,117 A | 8/1992 | Paisley et al. |
| 5,225,044 A | 7/1993 | Breu |
| 5,236,688 A | 8/1993 | Watanabe et al. |
| 5,239,946 A * | 8/1993 | Garcia-Mallol ............ 122/4 D |
| 5,243,922 A | 9/1993 | Rehmat et al. |
| 5,281,727 A | 1/1994 | Carver et al. |
| 5,306,481 A | 4/1994 | Mansour et al. |
| 5,326,919 A | 7/1994 | Paisley et al. |
| 5,371,212 A | 12/1994 | Moens |
| 5,376,340 A | 12/1994 | Bayer et al. |
| 5,380,916 A | 1/1995 | Rao |
| 5,407,674 A | 4/1995 | Gabetta et al. |
| 5,423,891 A | 6/1995 | Taylor |
| 5,426,807 A | 6/1995 | Grimsley et al. |
| 5,478,736 A | 12/1995 | Nair |
| 5,494,653 A | 2/1996 | Paisley |
| 5,520,722 A | 5/1996 | Hershkowitz et al. |
| 5,536,488 A | 7/1996 | Mansour et al. |
| 5,578,092 A | 11/1996 | Collin |
| 5,605,551 A | 2/1997 | Scott et al. |
| 5,637,192 A | 6/1997 | Mansour et al. |
| 5,654,448 A | 8/1997 | Pandey et al. |
| 5,662,050 A | 9/1997 | Angelo, II et al. |
| 5,713,977 A | 2/1998 | Kobayashi |
| 5,725,738 A | 3/1998 | Brioni et al. |
| 5,728,271 A | 3/1998 | Piskorz et al. |
| 5,744,333 A | 4/1998 | Cociancich et al. |

(56) References Cited

U.S. PATENT DOCUMENTS

| | | |
|---|---|---|
| 5,788,784 A | 8/1998 | Koppenhoefer et al. |
| 5,792,340 A | 8/1998 | Freel et al. |
| 5,853,548 A | 12/1998 | Piskorz et al. |
| 5,879,642 A | 3/1999 | Trimble et al. |
| 5,879,650 A | 3/1999 | Kaul et al. |
| 5,904,838 A | 5/1999 | Kalnes et al. |
| 5,961,786 A | 10/1999 | Freel et al. |
| 5,969,165 A | 10/1999 | Liu |
| 6,002,025 A | 12/1999 | Page et al. |
| 6,011,187 A | 1/2000 | Horizoe et al. |
| 6,106,702 A | 8/2000 | Sohn et al. |
| 6,113,862 A | 9/2000 | Jorgensen et al. |
| 6,133,499 A | 10/2000 | Horizoe et al. |
| 6,149,765 A | 11/2000 | Mansour et al. |
| 6,190,542 B1 | 2/2001 | Comolli et al. |
| 6,193,837 B1 | 2/2001 | Agblevor et al. |
| 6,237,541 B1 | 5/2001 | Alliston et al. |
| 6,339,182 B1 | 1/2002 | Munson et al. |
| 6,452,024 B1 | 9/2002 | Bui-Khac et al. |
| 6,455,015 B1 | 9/2002 | Kilroy |
| 6,485,841 B1 | 11/2002 | Freel et al. |
| 6,547,957 B1 | 4/2003 | Sudhakar et al. |
| 6,555,649 B2 | 4/2003 | Giroux et al. |
| 6,656,342 B2 | 12/2003 | Smith et al. |
| 6,660,157 B2 | 12/2003 | Que et al. |
| 6,676,828 B1 | 1/2004 | Galiasso et al. |
| 6,743,746 B1 | 6/2004 | Prilutsky et al. |
| 6,759,562 B2 | 7/2004 | Gartside et al. |
| 6,776,607 B2 | 8/2004 | Nahas et al. |
| 6,808,390 B1 | 10/2004 | Fung |
| 6,814,940 B1 | 11/2004 | Hiltunen et al. |
| 6,844,420 B1 | 1/2005 | Freel et al. |
| 6,875,341 B1 | 4/2005 | Bunger et al. |
| 6,960,325 B2 | 11/2005 | Kao et al. |
| 6,962,676 B1 | 11/2005 | Hyppanen |
| 6,988,453 B2 | 1/2006 | Cole et al. |
| 7,004,999 B2 | 2/2006 | Johnson et al. |
| 7,022,741 B2 | 4/2006 | Jiang et al. |
| 7,026,262 B1 | 4/2006 | Palmas et al. |
| 7,202,389 B1 | 4/2007 | Brem |
| 7,214,252 B1 | 5/2007 | Krumm et al. |
| 7,226,954 B2 | 6/2007 | Tavasoli et al. |
| 7,240,639 B2* | 7/2007 | Hyppanen et al. ............ 122/4 D |
| 7,247,233 B1 | 7/2007 | Hedrick et al. |
| 7,262,331 B2 | 8/2007 | van de Beld et al. |
| 7,263,934 B2 | 9/2007 | Copeland et al. |
| 7,285,186 B2 | 10/2007 | Tokarz |
| 7,319,168 B2 | 1/2008 | Sanada |
| 7,473,349 B2 | 1/2009 | Keckler et al. |
| 7,476,774 B2 | 1/2009 | Umansky et al. |
| 7,479,217 B2 | 1/2009 | Pinault et al. |
| 7,491,317 B2 | 2/2009 | Meier et al. |
| 7,563,345 B2 | 7/2009 | Tokarz |
| 7,572,362 B2 | 8/2009 | Freel et al. |
| 7,572,365 B2* | 8/2009 | Freel et al. ................ 208/226 |
| 7,578,927 B2 | 8/2009 | Marker et al. |
| 7,625,432 B2 | 12/2009 | Gouman et al. |
| 7,897,124 B2 | 3/2011 | Gunnerman et al. |
| 7,905,990 B2 | 3/2011 | Freel |
| 7,943,014 B2 | 5/2011 | Berruti et al. |
| 7,956,224 B2 | 6/2011 | Elliott et al. |
| 7,960,598 B2 | 6/2011 | Spilker et al. |
| 7,982,075 B2 | 7/2011 | Marker et al. |
| 7,998,315 B2 | 8/2011 | Bridgwater et al. |
| 7,998,455 B2 | 8/2011 | Abbas et al. |
| 7,999,142 B2 | 8/2011 | Kalnes et al. |
| 7,999,143 B2 | 8/2011 | Marker et al. |
| 8,043,391 B2 | 10/2011 | Dinjus et al. |
| 8,057,641 B2 | 11/2011 | Bartek et al. |
| 8,097,216 B2 | 1/2012 | Beech et al. |
| 8,147,766 B2 | 4/2012 | Spilker et al. |
| 8,153,850 B2 | 4/2012 | Hall et al. |
| 8,202,332 B2 | 6/2012 | Agblevor |
| 8,207,385 B2 | 6/2012 | O'Connor et al. |
| 8,217,211 B2 | 7/2012 | Agrawal et al. |
| 8,277,643 B2 | 10/2012 | Huber et al. |
| 8,288,600 B2 | 10/2012 | Bartek et al. |
| 8,304,592 B2 | 11/2012 | Luebke |
| 8,329,967 B2 | 12/2012 | Brandvold et al. |
| 8,499,702 B2* | 8/2013 | Palmas et al. ................ 110/341 |
| 8,524,087 B2 | 9/2013 | Frey et al. |
| 2002/0100711 A1* | 8/2002 | Freel et al. ................. 208/14 |
| 2002/0146358 A1 | 10/2002 | Smith et al. |
| 2003/0202912 A1 | 10/2003 | Myohanen et al. |
| 2004/0069682 A1* | 4/2004 | Freel et al. ................. 208/126 |
| 2004/0182003 A1 | 9/2004 | Bayle et al. |
| 2004/0200204 A1 | 10/2004 | Dries et al. |
| 2005/0167337 A1 | 8/2005 | Bunger et al. |
| 2005/0209328 A1 | 9/2005 | Allgood et al. |
| 2006/0010714 A1 | 1/2006 | Carin et al. |
| 2006/0016723 A1 | 1/2006 | Tang et al. |
| 2006/0070362 A1 | 4/2006 | Dewitz et al. |
| 2006/0074254 A1 | 4/2006 | Zhang et al. |
| 2006/0101665 A1 | 5/2006 | Carin et al. |
| 2006/0180060 A1 | 8/2006 | Crafton et al. |
| 2006/0201024 A1 | 9/2006 | Carin et al. |
| 2006/0254081 A1 | 11/2006 | Carin et al. |
| 2006/0264684 A1 | 11/2006 | Petri et al. |
| 2007/0000809 A1 | 1/2007 | Lin et al. |
| 2007/0141222 A1 | 6/2007 | Binder et al. |
| 2007/0205139 A1 | 9/2007 | Kulprathipanja et al. |
| 2007/0272538 A1 | 11/2007 | Satchell |
| 2008/0029437 A1 | 2/2008 | Umansky et al. |
| 2008/0035526 A1 | 2/2008 | Hedrick et al. |
| 2008/0050792 A1 | 2/2008 | Zmierczak et al. |
| 2008/0051619 A1 | 2/2008 | Kulprathipanja et al. |
| 2008/0081006 A1 | 4/2008 | Myers et al. |
| 2008/0086937 A1 | 4/2008 | Hazlebeck et al. |
| 2008/0161615 A1 | 7/2008 | Chapus et al. |
| 2008/0171649 A1 | 7/2008 | Jan et al. |
| 2008/0185112 A1 | 8/2008 | Argyropoulos |
| 2008/0189979 A1 | 8/2008 | Carin et al. |
| 2008/0193345 A1 | 8/2008 | Lott et al. |
| 2008/0194896 A1 | 8/2008 | Brown et al. |
| 2008/0199821 A1 | 8/2008 | Nyberg et al. |
| 2008/0230440 A1* | 9/2008 | Graham et al. ................ 208/49 |
| 2008/0236043 A1 | 10/2008 | Dinjus et al. |
| 2008/0264771 A1 | 10/2008 | Dam-Johansen et al. |
| 2008/0274017 A1 | 11/2008 | Boykin et al. |
| 2008/0274022 A1 | 11/2008 | Boykin et al. |
| 2008/0282606 A1 | 11/2008 | Plaza et al. |
| 2008/0312476 A1 | 12/2008 | McCall |
| 2008/0318763 A1 | 12/2008 | Anderson |
| 2009/0008292 A1 | 1/2009 | Keusenkothen et al. |
| 2009/0077867 A1 | 3/2009 | Marker et al. |
| 2009/0077868 A1 | 3/2009 | Brady et al. |
| 2009/0078557 A1 | 3/2009 | Tokarz |
| 2009/0078611 A1 | 3/2009 | Marker et al. |
| 2009/0082603 A1 | 3/2009 | Kalnes et al. |
| 2009/0082604 A1 | 3/2009 | Agrawal et al. |
| 2009/0084666 A1 | 4/2009 | Agrawal et al. |
| 2009/0090046 A1 | 4/2009 | O'Connor et al. |
| 2009/0090058 A1 | 4/2009 | Dam-Johansen et al. |
| 2009/0113787 A1 | 5/2009 | Elliott et al. |
| 2009/0139851 A1 | 6/2009 | Freel |
| 2009/0165378 A1 | 7/2009 | Agblevor |
| 2009/0183424 A1 | 7/2009 | Gorbell et al. |
| 2009/0188158 A1 | 7/2009 | Morgan |
| 2009/0193709 A1 | 8/2009 | Marker et al. |
| 2009/0208402 A1 | 8/2009 | Rossi |
| 2009/0227823 A1 | 9/2009 | Huber et al. |
| 2009/0250376 A1 | 10/2009 | Brandvold et al. |
| 2009/0253947 A1 | 10/2009 | Brandvold et al. |
| 2009/0253948 A1 | 10/2009 | McCall et al. |
| 2009/0255144 A1 | 10/2009 | Gorbell et al. |
| 2009/0259076 A1 | 10/2009 | Simmons et al. |
| 2009/0259082 A1 | 10/2009 | Deluga et al. |
| 2009/0283442 A1 | 11/2009 | McCall et al. |
| 2009/0287029 A1 | 11/2009 | Anumakonda et al. |
| 2009/0293344 A1 | 12/2009 | O'Brien et al. |
| 2009/0293359 A1 | 12/2009 | Simmons et al. |
| 2009/0294324 A1 | 12/2009 | Brandvold et al. |
| 2009/0301930 A1 | 12/2009 | Brandvold et al. |
| 2009/0308787 A1 | 12/2009 | O'Connor et al. |

(56) References Cited

U.S. PATENT DOCUMENTS

| | | |
|---|---|---|
| 2009/0318737 A1 | 12/2009 | Luebke |
| 2009/0321311 A1 | 12/2009 | Marker et al. |
| 2010/0043634 A1 | 2/2010 | Shulfer et al. |
| 2010/0133144 A1 | 6/2010 | Kokayeff et al. |
| 2010/0147743 A1 | 6/2010 | MacArthur et al. |
| 2010/0148122 A1 | 6/2010 | Breton et al. |
| 2010/0151550 A1 | 6/2010 | Signes Nunez et al. |
| 2010/0162625 A1 | 7/2010 | Mills |
| 2010/0163395 A1 | 7/2010 | Henrich et al. |
| 2010/0266464 A1 | 10/2010 | Sipila et al. |
| 2010/0325954 A1 | 12/2010 | Tiwari et al. |
| 2011/0068585 A1 | 3/2011 | Dube et al. |
| 2011/0113675 A1 | 5/2011 | Fujiyama et al. |
| 2011/0123407 A1 | 5/2011 | Freel |
| 2011/0132737 A1 | 6/2011 | Jadhav |
| 2011/0139597 A1 | 6/2011 | Lin |
| 2011/0146135 A1 | 6/2011 | Brandvold |
| 2011/0146140 A1 | 6/2011 | Brandvold et al. |
| 2011/0146141 A1 | 6/2011 | Frey et al. |
| 2011/0146145 A1 | 6/2011 | Brandvold et al. |
| 2011/0160505 A1 | 6/2011 | McCall |
| 2011/0182778 A1 | 7/2011 | Breton et al. |
| 2011/0201854 A1 | 8/2011 | Kocal et al. |
| 2011/0258914 A1 | 10/2011 | Banasiak et al. |
| 2011/0284359 A1 | 11/2011 | Sechrist et al. |
| 2012/0012039 A1 | 1/2012 | Palmas et al. |
| 2012/0017493 A1 | 1/2012 | Traynor et al. |
| 2012/0022171 A1 | 1/2012 | Frey |
| 2012/0137939 A1 | 6/2012 | Kulprathipanja |
| 2012/0172622 A1 | 7/2012 | Kocal |
| 2012/0205289 A1 | 8/2012 | Joshi |
| 2012/0279825 A1 | 11/2012 | Freel et al. |
| 2012/0317871 A1 | 12/2012 | Frey et al. |
| 2013/0062184 A1 | 3/2013 | Kulprathipanja et al. |
| 2013/0075072 A1 | 3/2013 | Kulprathipanja et al. |
| 2013/0078581 A1 | 3/2013 | Kulprathipanja et al. |
| 2013/0109765 A1 | 5/2013 | Jiang et al. |
| 2013/0150637 A1 | 6/2013 | Borremans et al. |
| 2013/0152453 A1 | 6/2013 | Baird et al. |
| 2013/0152454 A1 | 6/2013 | Baird et al. |
| 2013/0152455 A1 | 6/2013 | Baird et al. |
| 2013/0267743 A1 | 10/2013 | Brandvold et al. |
| 2014/0001026 A1 | 1/2014 | Baird et al. |
| 2014/0140895 A1 | 5/2014 | Davydov et al. |
| 2014/0142362 A1 | 5/2014 | Davydov et al. |

FOREIGN PATENT DOCUMENTS

| | | |
|---|---|---|
| CA | 1312497 | 1/1993 |
| CA | 2091373 | 9/1997 |
| CA | 2299149 | 12/2000 |
| CA | 2521829 | 3/2006 |
| CN | 1377938 | 11/2002 |
| CN | 101045524 | 10/2007 |
| CN | 101294085 | 10/2008 |
| CN | 101318622 | 12/2008 |
| CN | 101381611 | 3/2009 |
| CN | 101544901 | 9/2009 |
| CN | 101550347 | 10/2009 |
| EP | 0105980 B1 | 1/1986 |
| EP | 578503 | 1/1994 |
| EP | 676023 | 7/1998 |
| EP | 718392 | 9/1999 |
| EP | 0787946 B1 | 6/2000 |
| EP | 1420058 | 5/2004 |
| GB | 1019133 | 2/1966 |
| GB | 1300966 | 12/1972 |
| JP | 58150793 A | 9/1983 |
| JP | 1277196 A | 11/1989 |
| JP | 11148625 A | 6/1999 |
| JP | 2001/131560 | 5/2001 |
| JP | 2007/229548 | 9/2007 |
| SE | 9903742-6 | 1/2004 |
| WO | 91/11499 | 8/1991 |
| WO | 92/07842 | 5/1992 |
| WO | 92/18492 | 10/1992 |
| WO | 94/13827 | 6/1994 |
| WO | 97/44410 | 11/1997 |
| WO | 01/09243 | 2/2001 |
| WO | 01/83645 | 11/2001 |
| WO | 2007/017005 | 2/2007 |
| WO | 2007/045093 | 4/2007 |
| WO | 2007/050030 | 5/2007 |
| WO | 2007/128798 | 11/2007 |
| WO | 2008/009643 | 1/2008 |
| WO | 2008/020167 | 2/2008 |
| WO | 2008/092557 | 8/2008 |
| WO | 2009/019520 | 2/2009 |
| WO | 2009/047387 | 4/2009 |
| WO | 2009/047392 | 4/2009 |
| WO | 2009/099684 | 8/2009 |
| WO | 2009/118357 | 10/2009 |
| WO | 2009/118363 | 10/2009 |
| WO | 2009/126508 | 10/2009 |
| WO | 2012/009207 | 1/2012 |

OTHER PUBLICATIONS

Rodriguez, O.M.H., et al., "Heat recovery from hot solid particles in a shallow fluidized bed", Applied Thermal Engineering, vol. 22, No. 2, Feb. 2002, pp. 145-160.

Ravindranath, G., et al., "Heat transfer studies of bare tube bundles in gas-solid fluidized bed", 9th International Symposium on Fluid Control Measurement and Visualization 2007, FLUCOME 2007, vol. 3, 2007, pp. 1361-1369.

Pecora, A.A.B., et al., "An analysis of process heat recovery in a gas-solid shallow fluidized bed", Brazilian Journal of Chemical Engineering, vol. 23, No. 4, Oct./Dec. 2006, pp. 497-506.

Pecora, A. A. B., et al., "Heat transfer coefficient in a shallow fluidized bed heat exchanger with a continuous flow of solid particles", Journal of the Brazilian Society of Mechanical Sciences and Engineering, vol. 28, No. 3, 2006, pp. 253-258.

Stojanovic, B., et al., "Experimental investigation of thermal conductivity coefficient and heat exchange between fluidized bed and inclined exchange surface", Brazilian Journal of Chemical Engineering, vol. 26, No. 2, Apr.-Jun. 2009, pp. 343-352.

Petrik, P.T., et al., "Heat exchange in condensation of R227 coolant on inclined tubes placed in a granular BED", Journal of Engineering Physics and Thermophysics, vol. 77, No. 4, 2004, pp. 758-761.

Vasanova, L.K., "Characteristic features of heat transfer of tube bundles in a cross water-air flow and a three-phase fluidized bed", Heat Transfer Research, vol. 34, No. 5-6, 2003, pp. 414-420.

Chinsuwan, A., et al., "An experimental investigation of the effect of longitudinal fin orientation on heat transfer in membrane water wall tubes in a circulating fluidized bed, International Journal of Heat and Mass Transfer", vol. 52, No. 5-6, Feb. 2009, pp. 1552-1560.

AccessScience Dictionary, "ebullating-ed reactor," http://www.accessscience.com, last visited Jul. 15, 2014.

Adam, J. "Catalytic conversion of biomass to produce higher quality liquid bio-fuels," *PhD Thesis*, Department of Energy and Process Engineering, The Norwegian University of Science and Technology, Trondheim (2005).

Adam, J. et al. "Pyrolysis of biomass in the presence of Al-MCM-41 type catalysts," *Fuel*, 84 (2005) 1494-1502.

Adjaye, John D. et al. "Catalytic conversion of a biomass-derived oil to fuels and chemicals I: Model compound studies and reaction pathways," *Biomass & Bioenergy*, 8:3 (1995) 131-149.

Adjaye, John D. et al. "Catalytic conversion of a biomass-derived oil to fuels and chemicals II: Chemical kinetics, parameter estimation and model predictions," *Biomass & Bioenergy*, 8:4 (1995) 265-277.

Adjaye, John D. et al. "Catalytic conversion of wood derived bio-oil to fuels and chemicals," *Studies in Surface Science and Catalysis*, 73 (1992) 301-308.

Adjaye, John D. et al. "Production of hydrocarbons by the catalytic upgrading of a fast pyrolysis bio-oil," *Fuel Process Technol*, 45:3 (1995) 161-183.

Adjaye, John D. et al. "Upgrading of a wood-derived oil over various catalysts," *Biomass & Bioenergy*, 7:1-6 (1994) 201-211.

(56) References Cited

OTHER PUBLICATIONS

Aho, A. et al. "Catalytic pyrolysis of woody biomass in a fluidized bed reactor; Influence of zeolites structure, Science Direct," *Fuel*, 87 (2008) 2493-2501.

Antonakou, E. et al. "Evaluation of various types of Al-MCM-41 materials as catalysts in biomass pyrolysis for the production of bio-fuels and chemicals," *Fuel*, 85 (2006) 2202-2212.

Atutxa, A. et al. "Kinetic Description of the Catalytic Pyrolysis of Biomass in a Conical Spouted Bed Reactor," *Energy Fuels*, 19:3 (2005) 765-774.

Baker, E. G. et al. "Catalytic Upgrading of Biomass Pyrolysis Oils," in Bridgwater, A. V. et al. (eds) *Research in Thermochemical Biomass Conversion*, Elsevier Science Publishers Ltd., Barking, England (1988) 883-895.

Baldauf, W. et al. "Upgrading of flash pyrolysis oil and utilization in refineries," *Biomass & Bioenergy*, 7 (1994) 237-244.

Baumlin, "The continuous self stirred tank reactor: measurement of the cracking kinetics of biomass pyrolysis vapours," *Chemical Engineering Science*, 60 (2005) 41-55.

Berg, "Reactor Development for the Ultrapyrolysis Process," *The Canadian Journal of Chemical Engineering*, 67 (1989) 96-101.

Bielansky, P. et al. "Catalytic conversion of vegetable oils in a continuous FCC pilot plant," *Fuel Processing Technology*, 92 (2011) 2305-2311.

Bimbela, F. et al. "Hydrogen production by catalytic steam reforming of acetic acid, a model compound of biomass pyrolysis liquids," *J. Ana App. Pyrolysis*, 79 (2007) 112-120.

Bridgewater et al. (eds) *Fast Pyrolysis of Biomass: A Handbook*, Newbury Cpl Press, Great Britain (2002) 12-13.

Bridgwater, A.V. "Principles and practices of biomass fast pyrolysis processes for liquids," *Journal of Analytical and Applied Pyrolysis*, 51 (1999) 3-22.

Bridgwater, Tony "Production of high grade fuels and chemicals from catalytic pyrolysis of biomass," *Catalysis Today*, 29 (1996) 285-295.

Bridgwater, Tony et al. "Transport fuels from biomass by thermal processing," *EU-China Workshop on Liquid Biofuels*, Beijing, China (Nov. 4-5, 2004).

Buchsbaum, A. et al. "The Challenge of the Biofuels Directive for a European Refinery," *OMW Refining and Marketing, ERTC 9th Annual Meeting*, Prague, Czech Republic (Nov. 15-17, 2004).

Carlson, T. et al. "Aromatic Production from Catalytic Fast Pyrolysis of Biomass-Derived Feedstocks," *Top Catal*, 52 (2009) 241-242.

Carlson., T. et al. "Green Gasoline by Catalytic Fast Pyrolysis of Solid Biomass Derived Compounds," *ChemSusChem*, 1 (2008) 397-400.

Cass et al. "Challenges in the Isolation of Taxanes from *Taxus canadensis* by Fast Pyrolysis,"*J Analytical and Applied Pyrolysis* 57 (2001) 275-285.

Chantal, P. D. et al. "Production of Hydrocarbons from Aspen Poplar Pyrolytic Oils over H-ZSM5," *Applied Catalysis*, 10 (1984) 317-332.

Chen, N. Y. et al. "Fluidized Upgrading of Wood Pyrolysis Liquids and Related Compounds," in Soltes, E. J. et al. (eds) *Pyrolysis Oils from Biomass*, ACS, Washington, DC (1988) 277-289.

Cornelissen, T. et al., "Flash co-pyrolysis of biomass with polylactic acid. Part 1: Influence on bio-oil yield and heating value," *Fuel* 87 (2008) 1031-1041.

Cousins, A. et al. "Development of a bench-scale high-pressure fluidized bed reactor and its sequential modification for studying diverse aspects of pyrolysis and gasification of coal and biomass," *Energy and Fuels*, 22:4 (2008) 2491-2503.

Cragg et al. "The Search for New Pharmaceutical Crops: Drug Discovery and Development at the National Cancer Institute," in Janick, J. and Simon, J.E. (eds) *New Crops*, Wiley, New York (1993) 161-167.

Czernik, S. et al. "Hydrogen from biomass-production by steam reforming of biomass pyrolysis oil," *Catalysis Today*, 129 (2007) 265-168.

Czernik, S. et al. "Hydrogren by Catalytic Steam Reforming of Liquid Byproducts from Biomass Thermoconversion Processes," *Ind. Eng. Chern. Res.*, 41 (2002) 4209-4215.

Dahmen, "Rapid pyrolysis for the pretreatment of biomass and generation of bioslurry as intermediate fuel", *Chemie-Ingenieur-Technik*, 79:9 (2007) 1326-1327. Language: German (Abstract only; Machine translation of Abstract).

Dandik, "Catalytic Conversion of Used Oil to Hydrocarbon Fuels in a Fractionating Pyrolysis Reactor," *Energy & Fuels*, 12 (1998) 1148-1152.

Daoust et al. "Canada Yew (*Taxus canadensis Marsh.*) and Taxanes: a Perfect Species for Field Production and Improvement through Genetic Selection," Natural Resources Canada, Canadian Forest Service, Sainte-Foy, Quebec (2003).

de Wild. P. et al. "Lignin valorisation for chemicals and (transportation) fuels via (catalytic) pyrolysis and hydrodeoxygenation," *Environ. Prog. Sustainable Energy*, 28 (2009) 461-469.

Demirbas, Ayhan "Fuel Conversional Aspects of Palm Oil and Sunflower Oil," *Energy Sources*, 25 (2003) 457-466.

Di Blasi, C. et al. "Effects of Potassium Hydroxide Impregnation of Wood Pyrolysis, American Chemical Society," *Energy & Fuels* 23 (2009) 1045-1054.

Ellioti, D. "Historical Developments in Hydroprocessing Bio-oils," *Energy & Fuels*, 21 (2007) 1792-1815.

Ensyn Technologies Inc. "Catalytic de-oxygenation of biomass-derived RTP vapors." Prepared for ARUSIA, Agenzia Regionale Umbria per lo Sviluppo e L'Innovazione, Perugia, Italy (Mar. 1997).

Filtration, Kirk-Othmer Encyclopedia of Chemical Technology 5th Edition. vol. 11., John Wiley & Sons, Inc., Feb. 2005.

Gayubo, A. G. et al. "Deactivation of a HZSM-5 Zeolite Catalyst in the Transformation of the Aqueous Fraction of Biomass Pyrolysis Oil into Hydrocarbons," *Energy & Fuels*, 18:6 (2004) 1640-1647.

Gayubo, A. G. et al. "Undesired components in the transformation of biomass pyrolysis oil into hydrocarbons on an HZSM-5 zeolite catalyst," *J Chem Tech Biotech*, 80 (2005) 1244-1251.

Gevert, Bürjie S. et al. "Upgrading of directly liquefied biomass to transportation fuels: catalytic cracking," *Biomass* 14:3 (1987) 173-183.

Goesele, W. et al., Filtration, Wiley-VCH Verlag GmbH & Co. KGaA, Weinheim, 10.1002/14356007.b0210, 2005.

Grange, P. et al. "Hydrotreatment of pyrolysis oils from biomass: reactivity of the various categories of oxygenated compounds and preliminary techno-economical study," *Catalysis Today*, 29 (1996) 297-301.

Hama, "Biodiesel-fuel production in a packed-bed reactor using lipase-producing *Rhizopus oryzae* cells immobilized within biomass support particles", *Biochemical Engineering Journal*, 34 (2007) 273-278.

Hoekstra, E. et al., "Fast Pyrolysis of Biomass in a Fluidized Bed Reactor: In Situ Filtering of the Vapors," *Ind. Eng. Chern. Res.*, 48:10 (2009) 4744-4756.

Holton et al. "First Total Synthesis of Taxol. 2. Completion of the C and D Rings," *J Am Chem Soc*, 116 (1994) 1599-1600.

Horne, Patrick A. et al. "Catalytic coprocessing of biomass-derived pyrolysis vapours and methanol," *J. Analytical and Applied Pyrolysis*, 34:1 (1995) 87-108.

Horne, Patrick A. et al. "Premium quality fuels and chemicals from the fluidised bed pyrolysis of biomass with zeolite catalyst upgrading," *Renewable Energy*, 5:5-8 (1994) 810-812.

Horne, Patrick A. et al. "The effect of zeolite ZSM-5 catalyst deactivation during the upgrading of biomass-derived pyrolysis vapours," *J Analytical and Applied Pyrolysis*, 34:1 (1995) 65-85.

Huang et al. "New Taxanes from *Taxus brevifolia*," *J of Natural Products*, 49 (1986) 665-669.

Huffman, D. R. et al., Ensyn Technologies Inc., "Thermo-Catalytic Cracking of Wood to Transportation Fuels," DSS Contract No. 38SQ. 23440-4-1429, Efficiency and Alternative Energy Technology Branch, Natural Resources Canada, Ottawa, Canada (1997).

Huffman, D. R., Ensyn Technologies Inc., "Thermo-catalytic cracking of wood to transportation fuels using the RTP process," DSS Contract No. 38SQ.23440-4-1429, Efficiency and Alternative Energy Technology Branch, Natural Resources Canada, Ottawa, Ontario (Jan. 1997).

(56) References Cited

OTHER PUBLICATIONS

Hughes, J. et al. "Structural variations in natural F, OH and Cl apatites," *American Mineralogist*, 74 (1989) 870-876.

Huie, C. W. "A review of modern sample-preparation techniques for the extraction and analysis of medicinal plants," *Anal Bioanal Chem*, 373 (2002) 23-30.

International Search Report dated Feb. 22, 2013 for corresponding International Application No. PCT/US2012/68876.

Ioannidou, "Investigating the potential for energy, fuel, materials and chemicals production from corn residues (cobs and stalks) by non-catalytic and catalytic pyrolysis in two reactor configurations," *Renewable and Sustainable Energy Reviews*, 13 (2009) 750-762.

Iojoiu, E. et al. "Hydrogen production by sequential cracking of biomass-derived pyrolysis oil over noble metal catalysts supported on ceria-zirconia," *Applied Catalysis A: General*, 323 (2007) 147-161.

Jackson, M. et al. "Screening heterogenous catalysts for the pyrolysis of lignin," *J. Anal. Appl. Pyrolysis*, 85 (2009) 226-230.

Junming et al. "Bio-oil upgrading by means of ethyl ester production in reactive distillation to remove water and to improve storage and fuel characteristics," *Biomass and Energy*, 32 (2008) 1056-1061.

Kalnes, Tom et al. "Feedstock Diversity in the Refining Industry," UOP Report to NREL and DOE (2004).

Khanal, "Biohydrogen Production in Continuous-Flow Reactor Using Mixed Microbial Culture," *Water Environment Research*, 78:2 (2006) 110-117.

Khimicheskaya Entsiklopediya. Pod red. N. S. Zefirov. Moskva, Nauchnoe Izdatelstvo "Bolshaya Rossyskaya Entsiklopediya", 1995, p. 133-137,529-530.

Kingston et al. "New Taxanes from *Taxus brevifolia*," *J of Natural Products*, 45 (1982) 466-470.

Lappas, A. A. et al. "Biomass pyrolysis in a circulating fluid bed reactor for the production of fuels and chemicals," *Fuel*, 81 (2002) 2087-2095.

Lappas, A.A. et al. "Production of Transportation Fuels from Biomass," *Workshop of Chemical Process Engineering Research Institute/Center for Research and Technology Hellas*, Thermi-Thessaloniki, Greece (2004).

Lappas, A.A., "Production of biofuels via co-processing in conventional refining process," *Catalysis Today*, 145 (2009) 55-62.

Maiti, R.N. et al. "Gas-liquid distributors for trickle-bed reactors: A review"; *Industrial and Engineering Chemistry Research*, 46:19 (2007) 6164-6182.

Mancosky, "The use of a controlled cavitation reactor for bio-diesel production," (abstract only), AIChE Spring National Meeting 2007, Houston, Texas.

Marker, Terry L., et al. "Opportunities for Biorenewables in Petroleum Refineries," Proceedings of the 230th ACS National Meeting, Washington, DC, Paper No. 125, Fuel Division (Aug. 31, 2005) (abstract only).

Marker, Terry L., et al., UOP, "Opportunities for Biorenewables in Oil Refineries," Final Technical Report, U.S. Department of Energy Award No. DE-FG36-05G015085, Report No. DOEGO15085Final (2005).

Marquevich, "Hydrogen from Biomass: Steam Reforming of Model Compounds of Fast-Pyrolysis Oil," *Energy & Fuels*, 13 (1999) 1160-1166.

McLaughlin et al. 19-Hydroxybaccatin III, 10-Deacetylcephalo-Mannine, and 10-Deacetyltaxol: New Anti-Tumor Taxanes from *Taxus wallichiana*, *J of Natural Products*, 44 (1981) 312-319.

McNeil "Semisynthetic Taxol Goes on Market Amid Ongoing Quest for New Versions," *J of the National Cancer Institute*, 87:15 (1995) 1106-1108.

Meier, D. et al. "State of the art of applied fast pyrolysis of lignocellulosic materials—a review," *Bioresource Technology*, 68:1 (1999) 71-77.

Meier, D. et al., "Pyrolysis and Hydroplysis of Biomass and Lignins—Activities at the Institute of Wood Chemistry in Hamburg, Germany," vol. 40, No. 2, Preprints of Papers Presented at the 209th ACS National Meeting, Anaheim, CA (Apr. 2-7, 1995).

Mercader, F. et al. "Pyrolysis oil upgrading by high pressure thermal treatment," *Fuel*, 89:10 (2010) 2829-2837.

Miller et al. "Antileukemic Alkaloids from *Taxus wallichiana Zucc*," *J Org Chem*, 46 (1981) 1469-1474.

Mohan, D. et al. "Pyrolysis of Wood/Biomass for Bio-oil: A Critical Review," *Energy Fuels*, 20:3 (2006) 848-849.

Newton "Taxol: A Case Study in Natural Products Chemistry," Lecture Notes, University of Southern Maine, http://www.usm.maine.edu/ (2009) 1-6.

Nicolaou et al. "Total Synthesis of Taxol," *Nature*, 367 (1994) 630-634.

Nowakowski, D. et al. "Potassium catalysis in the pyrolysis behaviour of short rotation willow coppice," *Fuels*, 86 (2007) 2389-2402.

Ognisty, T. P. "The direct contact heat transfer performance of a spray nozzle, a notched through distributor, and two inch Pall rings," AIChE 1990 Spring National Meeting (Orlando Mar. 18-22, 1990) Preprint N. 37c 36P, Mar. 18, 1990.

Ohman "Bed Agglomeration Characteristics during Fluidized Bed Combustion of Biomass Fuels," *Energy & Fuels*, 14 (2000) 169-178.

Okumura, Y. et al. "Pyrolysis and gasification experiments of biomass under elevated pressure condition," Nihon Kikai Gakkai Ronbunshu, B Hen/Transactions of the Japan Society of Mechanical Engineers, Part B, vol. 73, No. 7, 2007, pp. 1434-1441.

Olazar, M. et al. "Pyrolysis of Sawdust in a Conical Spouted-Bed Reactor with a HZSM-5 Catalyst," *AIChE Journal*, 46:5 (2000) 1025-1033.

Onay "Influence of pyrolysis temperature and heating rate on the production of bio-oil and char from safflower seed by pyrolysis, using a well-swept fixed-bed reactor," *Fuel Processing Technology*, 88 (2007) 523-531.

Onay, "Production of Bio-Oil from Biomass: Slow Pyrolysis of Rapeseed (*Brassica napus* L.) in a Fixed-Bed Reactor," *Energy Sources*, 25 (2003) 879-892.

Ong et al. "Pressurized hot water extraction of bioactive or marker compounds in botanicals and medicinal plant materials," *J Chromatography A*, 1112 (2006) 92-102.

Ooi, Y. S. et al. "Catalytic Cracking of Used Palm Oil and Palm Oil Fatty Acids Mixture for the Production of Liquid Fuel: Kinetic Modeling." *J Am Chem Soc*, 18 (2004) 1555-1561.

Otterstedt, J. E. et al. "Catalytic Cracking of Heavy Oils," in Occelli, Mario L. (ed) Fluid Catalytic Cracking, Chapter 17, ACS, Washington, DC (1988) 266-278.

Padmaja, K.V. et al. "Upgrading of Candelilla biocrude to hydrocarbon fuels by fluid catalytic cracking," *Biomass and Bioenergy*, 33 (2009) 1664-1669.

Pavia et al., Intro to Org Labo Techniques (1988) 3d ed. Saunders College Publishing, Washington p. 62-66, 541-587.

PCT/US2012/055384 International Search Report, dated Mar. 28, 2013, and International Preliminary Report on Patentability, dated Mar. 25, 2014.

Prasad Y. S. et al. "Catalytic conversion of canola oil to fuels and chemical feedstocks. Part II. Effect of co-feeding steam on the performance of HZSM-5 catalyst," *Can J Chem Eng*, 64 (1986) 285-292.

Prins, Wolter et al. "Progress in fast pyrolysis technology," *Topsoe Catalysis Forum 2010*, Munkerupgaard, Denmark (Aug. 19-20, 2010).

Radlein, D. et al. "Hydrocarbons from the Catalytic Pyrolysis of Biomass," *Energy & Fuels*, 5 (1991) 760-763.

Rao "Taxol and Related Taxanes. I. Taxanes of *Taxus brevifolia* Bark," *Pharm Res* 10:4 (1993) 521-524.

Rao et al. "A New Large-Scale Process for Taxol and Related Taxanes from *Taxus brevifolia*," *Pharm Res*, 12:7 (1995) 1003-1010.

Samolada, M. C. et al. "Production of a bio-gasoline by upgrading biomass flash pyrolysis liquids via hydrogen processing and catalytic cracking," *Fuel*, 77:14 (1998) 1667-1674.

Sang "Biofuel Production from Catalytic Cracking of Palm Oil," *Energy Sources*, 25 (2003) 859-869.

Scahill, J. et al. " Removal of Residual Char Fines from Pyrolysis Vapors by Hot Gas Filtration," in Bridgwater, A. V. et al. (eds) *Developments in Thermochemical Biomass Conversion*, Springer Science+Business Media, Dordrecht (1997) 253-266.

(56) References Cited

OTHER PUBLICATIONS

Scott, D. et al. Pretreatment of poplar wood for fast pyrolysis: rate of cation removal, *Journal of Analytical and Applied Pyrolysis*, 57 (2000) 169-176.

Senilh et al. "Mise en Evidence de Nouveaux Analogues du Taxol Extraits de *Taxus baccata*, "*J of Natural Products*, 47 (1984) 131-137. (English Abstract included).

Sharma, R. "Upgrading of pyrolytic lignin fraction of fast pyrolysis oil to hydrocarbon fuels over HZSM-5 in a dual reactor system," *Fuel Processing Technology*, 35 (1993) 201-218.

Sharma, R. K. et al. "Catalytic Upgrading of Pyrolysis Oil," *Energy & Fuels*, 7 (1993) 306-314.

Sharma, R. K. et al. "Upgrading of wood-derived bio-oil over HZSM-5," *Bioresource Technology*, 35:1 (1991) 57-66.

Smith R.M. "Extractions with superheated water," *J Chromatography A*, 975 (2002) 31-46.

Snader "Detection and Isolation," in Suffness, M. (ed) *Taxol-Science and Applications*, CRC Press, Boca Raton, Florida (1995) 277-286.

Srinivas, S.T. et al "Thermal and Catalytic Upgrading of a Biomass-Derived Oil in a Dual Reaction System," *Can. J. Chem. Eng.*, 78 (2009) 343-354.

Stierle et al. "The Search for Taxol-Producing Microorganism Among the Endophytic Fungi of the Pacific Yew, *Taxus brevifolia*," *J of Natural Products*, 58 (1995) 1315-1324.

Sukhbaatar, B. "Separation of Organic Acids and Lignin Fraction From Bio-Oil and Use of Lignin Fraction in Phenol-Formaldehyde Wood Adhesive Resin," *Master's Thesis*, Mississippi State (2008).

Twaiq, A. A. et al. "Performance of composite catalysts in palm oil cracking for the production of liquid fuels and chemicals," *Fuel Processing Technology*, 85 (2004) 1283-1300.

Twaiq, F. A. et al. "Liquid hydrocarbon fuels from palm oil by catalytic cracking over aluminosilicate mesoporous catalysts with various Si/Al ratios,"*Microporous and Mesoporous Materials*, 64 (2003) 95-107.

Tyson, K. et al. "Biomass Oil Analysis: Research Needs and Recommendations," National Renewable Energy Laboratory, Report No. NREL/TP-510-34796 (Jun. 2004).

Valle, B. et al, "Integration of Thermal Treatment and Catalytic Transformation for Upgrading Biomass Pyrolysis Oil," *International Journal of Chemical Reactor Engineering*, 5:1 (2007).

Vitolo, S. et al. "Catalytic upgrading of pyrolytic oils over HZSM-5 zeolite: behaviour of the catalyst when used in repeated upgrading-regenerating cycles," *Fuel*, 80 (2001) 17-26.

Vitolo, S. et al. "Catalytic upgrading of pyrolytic oils to fuel over different zeolites," *Fuel*, 78:10 (1999) 1147-1159.

Wang, Xianhua et al., "The Influence of Microwave Drying on Biomass Pyrolysis," *Energy & Fuels* 22 (2008) 67-74.

Westerhof, Roel J. M. et al., "Controlling the Water Content of Biomass Fast Pyrolysis Oil," *Ind. Eng. Chem. Res.* 46 (2007) 9238-9247.

Williams, Paul T. et al. "Characterisation of oils from the fluidised bed pyrolysis of biomass with zeolite catalyst upgrading," *Biomass and Bioenergy*, 7:1-6 (1994) 223-236.

Williams, Paul T. et al. "Comparison of products from the pyrolysis and catalytic pyrolysis of rice husks," *Energy*, 25:6 (2000) 493-513.

Williams, Paul T. et al. "The influence of catalyst type on the composition of upgraded biomass pyrolysis oils," *J Analytical and Applied Pyrolysis*, 31 (1995) 39-61.

Yukimune et al. "Methyl Jasmonate-induced Overproduction of Paclitaxel and Baccatin III in Taxus Cell Suspension Cultures," *Nature Biotechnology* 14 (1996) 1129-1132.

Zhang et al. "Investigation on initial stage of rapid pyrolysis at high pressure using Taiheiyo coal in dense phase," *Fuel*, 81:9 (2002) 1189-1197.

Zhang, "Hydrodynamics of a Novel Biomass Autothermal Fast Pyrolysis Reactor: Flow Pattern and Pressure Drop," *Chem. Eng. Technol.*, 32:1 (2009) 27-37.

Graham, R.G. et al. "Thermal and Catalytic Fast Pyrolysis of Lignin by Rapid Thermal Processing (RPT)," Seventh Canadian Bioenergy R&D Seminar, Skyline Hotel, Ottawa, Ontario, Canada, Apr. 24-26, 1989.

\* cited by examiner

APPARATUSES AND METHODS FOR CONTROLLING HEAT FOR RAPID THERMAL PROCESSING OF CARBONACEOUS MATERIAL

FIELD OF THE INVENTION

The present invention relates generally to apparatuses and methods for thermal processing of carbonaceous material, and more particularly relates to apparatuses and methods for controlling heat for rapid thermal processing of carbonaceous material.

BACKGROUND OF THE INVENTION

The processing of carbonaceous feedstocks (e.g. biomass) to produce chemicals and/or fuels can be accomplished by fast (rapid or flash) pyrolysis. Fast pyrolysis is a generic term that encompasses various methods of rapidly imparting a relatively high temperature to feedstocks for a very short time, and then rapidly reducing the temperature of the primary products before chemical equilibrium can occur. Using this approach, the complex structures of carbonaceous feedstocks are broken into reactive chemical fragments, which are initially formed by depolymerization and volatilization reactions. The non-equilibrium products are then preserved by rapidly reducing the temperature.

More recently, a rapid thermal process (RTP) has been developed for carrying out fast pyrolysis of carbonaceous material. The RTP utilizes an upflow transport reactor and reheater arrangement, and makes use of an inert inorganic solid particulate heat carrier (e.g. typically sand) to carry and transfer heat in the process. The RTP reactor provides an extremely rapid heating rate and excellent particle ablation of the carbonaceous material, which is particularly well-suited for processing of biomass, as a result of direct turbulent contact between the heated inorganic solid particulates and the carbonaceous material as they are mixed together and travel upward through the reactor. In particular, the heated inorganic solid particulates transfer heat to pyrolyze the carbonaceous material forming char and gaseous products including high quality pyrolysis gas, which are removed from the reactor to a cyclone. The cyclone separates the gaseous products and solids (e.g. inorganic solid particulates and char), and the solids are passed to the reheater.

The reheater is a vessel that burns the char into ash and reheats the inorganic solid particulates, which are then returned to the reactor for pyrolyzing more carbonaceous material. An oxygen-containing gas, typically air, is supplied to the reheater for burning the char. The inorganic solid particulates and char are contained in the lower portion of the reheater and are fluidized by the air, forming a fluidized bubbling bed also referred to as the dense phase. The reheater also has a dilute phase that is above the dense phase and comprises primarily flue gas, entrained inorganic particles, and ash, which are the byproducts formed from combusting the char with the air. The flue gas, entrained inorganic particles, and ash are removed from the reheater to a cyclone which separates the solids from the flue gas.

Currently, higher capacity RTP arrangements are desired that are capable of handling carbonaceous feedstock rates of up to about 400 bone dry metric tons per day (BDMTPD) or higher compared to previously lower feedstock rates of less than about 100 BDMTPD. The increased capacity results in more char being produced in the RTP reactor, and the RTP reheater and auxiliary equipment (e.g. cyclone, air blower, etc.) need to be larger in size to support the increased feedstock rate. In particular, many newer RTP reheaters require additional volume to accommodate additional air supplied to the reheaters for cooling to control the otherwise rising temperatures from burning the additional char, and can have sizes of up to about 12 meters (m) or greater in diameter and heights of up to about 25 m or greater. Unfortunately, the larger sizes of these reheaters substantially increase the cost and complexity of shipping, installing, and operating the reheaters.

Accordingly, it is desirable to provide apparatuses and methods for controlling heat for rapid thermal processing that can adequately support higher carbonaceous feedstock rates without exceeding the design temperature of the reheater from burning the additional char. Moreover, it is also desirable to provide apparatuses and methods for controlling heat for rapid thermal processing without substantially increasing the cost and complexity of shipping, installing, and operating the reheaters. Furthermore, other desirable features and characteristics of the present invention will become apparent from the subsequent detailed description of the invention and the appended claims, taken in conjunction with the accompanying drawings and this background of the invention.

SUMMARY OF THE INVENTION

Apparatuses and methods for controlling heat for rapid thermal processing of carbonaceous material are provided herein. In accordance with an exemplary embodiment, an apparatus for controlling heat for rapid thermal processing of carbonaceous material comprises a reheater configured to contain a fluidized bubbling bed that comprises an oxygen-containing gas, inorganic heat carrier particles, and char and to operate at combustion conditions effective to burn the char into ash and heat the inorganic heat carrier particles to form heated inorganic particles. An inorganic particle cooler is in fluid communication with the reheater to receive a first portion of the heated inorganic particles and is configured to receive a cooling medium for indirect heat exchange with the first portion of the heated inorganic particles to form first partially-cooled heated inorganic particles. The reheater and the inorganic particle cooler are cooperatively configured to combine the first partially-cooled heated inorganic particles with a second portion of the heated inorganic particles in the reheater to form second partially-cooled heated inorganic particles. A reactor is in fluid communication with the reheater to receive the second partially-cooled heated inorganic particles.

In accordance with another exemplary embodiment, an apparatus for controlling heat for rapid thermal processing of carbonaceous material is provided. The apparatus comprises a reactor and a reheater that is in fluid communication with the reactor to receive inorganic heat carrier particles and char. The reheater is configured to form a fluidized bubbling bed that comprises an oxygen-containing gas, the inorganic heat carrier particles, and the char and to operate at combustion conditions effective to burn the char into ash and heat the inorganic heat carrier particles to form heated inorganic particles. An inorganic particle cooler is in fluid communication with the reheater and comprises a shell portion and a tube portion that is disposed in the shell portion. The inorganic particle cooler is configured such that the tube portion receives a portion of the heated inorganic particles and the shell portion receives a cooling medium for indirect heat exchange with the portion of the heated inorganic particles to form partially-cooled heated inorganic particles that are fluidly communicated to the reheater.

In accordance with another exemplary embodiment, a method for controlling heat for rapid thermal processing of carbonaceous material is provided. The method comprises the steps of combining an oxygen-containing gas, inorganic heat carrier particles, and char at combustion conditions effective to burn the char into ash and heat the inorganic heat carrier particles to form heated inorganic particles. Heat from a first portion of the heated inorganic particles is indirectly exchanged to a cooling medium to form first partially-cooled heated inorganic particles. The first partially-cooled heated inorganic particles are combined with a second portion of the heated inorganic particles to form second partially-cooled heated inorganic particles.

BRIEF DESCRIPTION OF THE DRAWINGS

Embodiments of the present invention will hereinafter be described in conjunction with the following drawing figures, wherein like numerals denote like elements, and wherein.

DETAILED DESCRIPTION

The following Detailed Description is merely exemplary in nature and is not intended to limit the invention or the application and uses of the invention. Furthermore, there is no intention to be bound by any theory presented in the preceding Background of the Invention or the following Detailed Description.

Various embodiments contemplated herein relate to apparatuses and methods for controlling heat for rapid thermal processing of carbonaceous material. Unlike the prior art, the exemplary embodiments taught herein provide an apparatus comprising a reactor, a reheater that is in fluid communication with the reactor, and an inorganic particle cooler that is in fluid communication with the reheater. The reactor rapidly pyrolyzes a carbonaceous feedstock with heated inorganic particles to form gaseous products and solids that include cooled inorganic heat carrier particles and char. A cyclone separates the gaseous products from the solids. The reheater receives the solids and fluidizes the cooled inorganic heat carrier particles and char with an oxygen-containing gas to form a fluidized bubbling bed. The reheater is operating at combustion conditions effective to burn the char into ash and reheat the cooled inorganic heat carrier particles to form heated inorganic particles.

In an exemplary embodiment, a portion of the heated inorganic particles and a cooling medium are fluidly communicated to the inorganic particle cooler. Some of the heat from the heated inorganic particles is indirectly exchanged with the cooling medium to partially cool the heated inorganic particles, forming a heated cooling medium and first partially-cooled heated inorganic particles. The heated cooling medium is removed from the inorganic particle cooler. The first partially-cooled heated inorganic particles are fluidly communicated to the reheater and combined with the remaining portion of the heated inorganic particles to partially cool the heated inorganic particles, forming second partially-cooled heated inorganic particles. The second partially-cooled heated inorganic particles are fluidly communicated to the reactor for continued rapid pyrolysis of the carbonaceous feedstock. The inventors have found that partially cooling the heated inorganic particles with the inorganic particle cooler facilitates controlling the temperatures from excessively rising in the reheater even if the fluidized bubbling bed contains higher levels of char. Accordingly, the reheater does not require additional volume that would otherwise be needed to accommodate additional air for cooling to control the reheater temperatures and therefore, the cost and complexity of shipping, installing, and operating the reheater is not substantially impacted.

Figure 1:
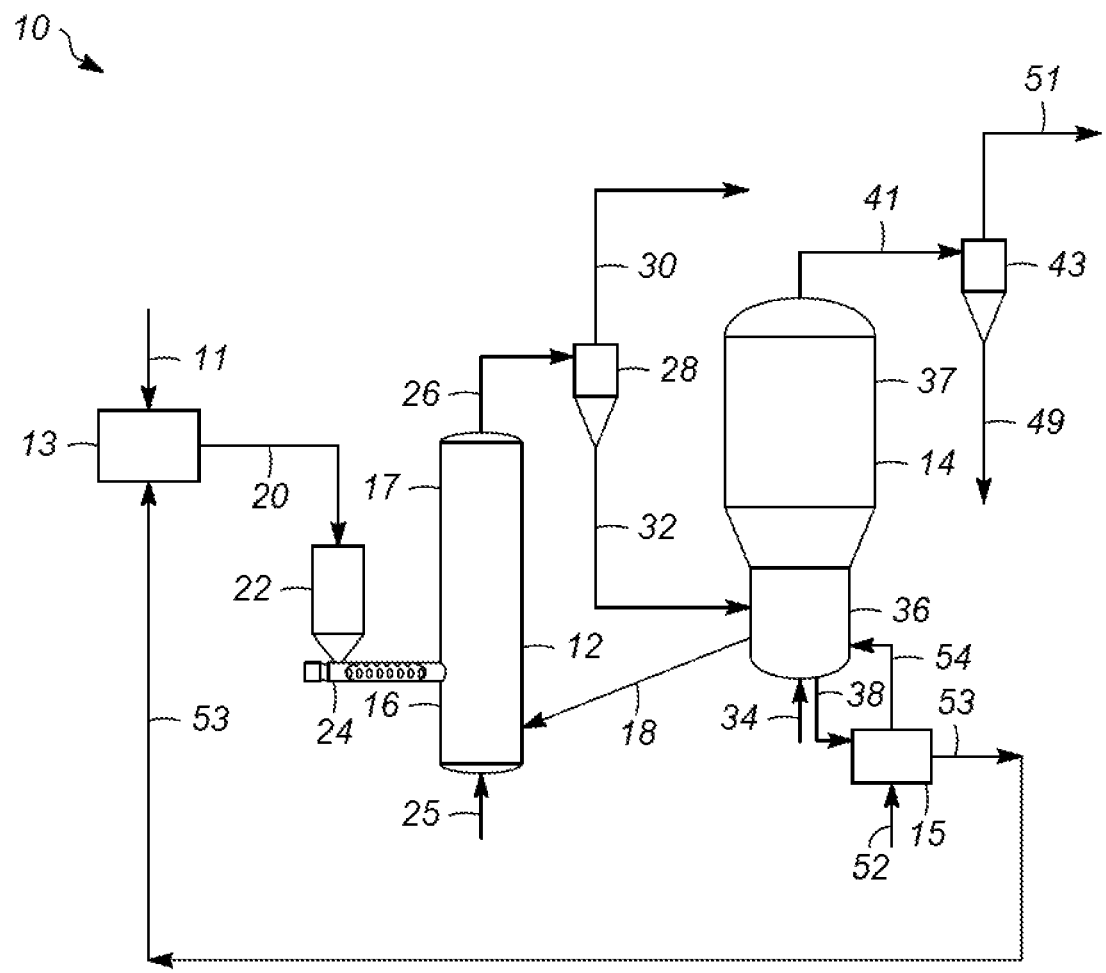
FIG. 1 schematically illustrates an apparatus for rapid thermal processing of carbonaceous material in accordance with an exemplary embodiment.

Referring to FIG. 1, a schematic depiction of an apparatus 10 for rapid thermal processing of a carbonaceous material in accordance with an exemplary embodiment is provided. The apparatus 10 comprises an upflow transport reactor 12, a reheater 14, and an inorganic particle cooler 15. The reactor 12 is configured for achieving a relatively high temperature within a minimum amount of time as well as providing a relatively short residence time at the high temperature to affect fast pyrolysis of a carbonaceous feedstock 20 (e.g. biomass including biomass waste). The relatively high temperature is achieved in a lower portion 16 of the reactor 12 using heated inorganic heat carrier particles 18 (e.g., heated sand) that are supplied from the reheater 14 to drive the pyrolysis process.

As illustrated and will be discussed in further detail below, a dryer 13 removes water from a moisture-containing carbonaceous feedstock 11 to form a carbonaceous feedstock 20 that preferably has a moisture content of about 6 weight percent (wt. %) or less. The carbonaceous feedstock 20 is supplied to a feed bin 22 where a reactor feed conveyor 24 introduces the carbonaceous feedstock 20 to the lower portion 16 of the reactor 12. A carrier gas 25, which can be a recirculation gas collected from a suitable location along the apparatus 10, is also introduced to the lower portion 16 of the reactor 12. The carrier gas 25 preferably contains less than about 1 wt. % of oxygen, and more preferably, less than about 0.5 wt. % of oxygen so that there is very little or no oxygen present thus minimizing or preventing oxidation and/or combustion of the carbonaceous feedstock 20 in the reactor 12.

Rapid mixing of the heated inorganic heat carrier particles 18 and the carbonaceous feedstock 20 occur in the lower portion 16 of the reactor 12. As the mixture advances up the reactor 12 in turbulent flow with the carrier gas 25, heat is transferred from the heated inorganic heat carrier particles 18 to the carbonaceous feedstock 20. In an exemplary embodiment, mixing and rapid heat transfer occurs within about 10% of the desired overall reactor resident time. Accordingly, the mixing time is preferably less than about 0.1 seconds, and more preferably within about 0.015 to about 0.030 seconds. In an exemplary embodiment, the temperature in the lower portion 16 of the reactor 12 is from about 600 to about 780° C., and the heating rate of the carbonaceous feedstock 20 is preferably about 1000° C. per second or greater. The use of sand or other suitable inorganic particulate as a solid heat carrier enhances the heat transfer because of the higher heat carrying capacity of the inorganic particles, and the ability of the inorganic particles to mechanically ablate the surface of the reacting carbonaceous material.

As the heated mixture is carried towards an upper portion 17 of the reactor 12 with the carrier gas 25, fast pyrolysis of the carbonaceous feedstock 20 occurs. In an exemplary embodiment, the temperature in the upper portion 17 of the reactor 12 is from about 450 to about 600° C. The sand or other inorganic heat carrier particles and the carrier gas 25, along with product vapors 30 and char form a product stream 26 that is carried out of the upper portion 17 of the reactor 12 to a cyclone 28. The cyclone 28, preferably a reverse flow cyclone, removes the solids 32, e.g., sand and char, from the product vapors 30, which comprise the carrier gas 25, non-condensible product gases and the primary condensible vapor products. The product vapors 30 are removed from the cyclone 28 and passed to a Quench Tower (not shown), for example, for rapid cooling or quenching to preserve the yields of the valuable non-equilibrium products in the product vapors 30. The solids 32 are removed from the cyclone 28 and passed to the reheater 14.

The reheater 14 receives an oxygen-containing gas 34, which is typically air. The solids 32 are contained in a lower portion 36 of the reheater 14 and are fluidized by the oxygen-containing gas 34 from a gas distributor 86 (see FIG. 2) to form a fluidized bubbling bed of char, inorganic heat carrier particles, and the oxygen-containing gas 34. The reheater 14 is operating at combustion conditions to burn the char into ash and flue gas. The energy released from combustion of the char reheats the inorganic heat carrier particles to form heated inorganic particles. In an exemplary embodiment, the heated inorganic particles have a temperature of from about 600 to about 780° C.

The flue gas, entrained sand, and ash rise to an upper portion 37 of the reheater 14 and are carried out of the reheater 14 as an exhaust stream 41 to a cyclone 43. The cyclone 43, preferably a reverse flow cyclone, removes the sand and ash from the flue gas. The flue gas is passed along as a gas stream 51 for exhausting, subsequent processing, recirculation, or a combination thereof, and the sand and ash are passed along as a solids-containing stream 49 for disposal or subsequent processing.

Figure 2:
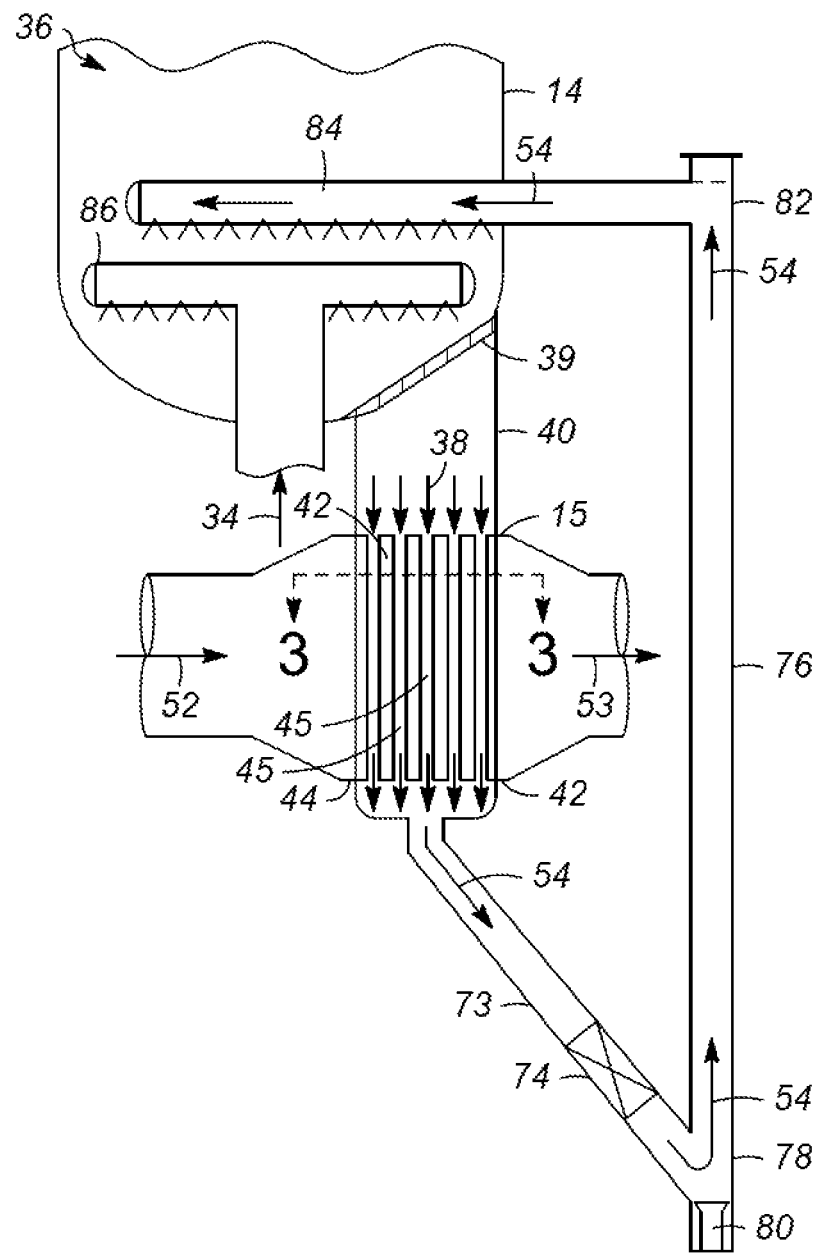
FIG. 2 is a partial sectional view of the apparatus depicted in FIG. 1 including an inorganic particle cooler in accordance with an exemplary embodiment.

Referring also to FIG. 2, in an exemplary embodiment, a portion of heated inorganic particles 38 is removed from the reheater 14 and introduced to the inorganic particle cooler 15. As illustrated, the portion of heated inorganic particles 38 is removed from the lower portion 36 of the reheater 14 and passed along a cooler inlet pipe 40 through at least one bubble breaking grating 39 to an exchanger vessel 42. The bubble breaking grating 39 breaks up any larger air-bubbles, for example, from the fluidized inorganic particles that otherwise may be passed along countercurrent to the portion of heated inorganic particles 38, back up to the bubbling bed at the lower portion 36 of the reheater 14. Big bubbles in the fluidized bed affect the reheater's 14 performance and solid entrainment. The bubble breaking grating 39 also serves as a screener to prevent bigger chunks of material, such as refractory from directly blocking or plugging the tube portion 45 and reducing the inorganic particle cooler capacity.

In an exemplary embodiment, the exchanger vessel 42 is configured as a heat exchanger and comprises a shell portion 44 and a tube portion 45 that is disposed in the shell portion 44. The portion of the heated inorganic particles 38 is passed through the tube portion 45. The shell portion 44 of the exchanger vessel 42 receives a cooling medium 52 for indirect heat exchange with the portion of heated inorganic particles 38 passing through the tube portion 45 to form partially-cooled heated inorganic particles 54 and a heated cooling medium 53. In an exemplary embodiment, the partially-cooled heated inorganic particles 54 have a temperature of from about 500 to about 680° C.

Preferably, the cooling medium 52 comprises air and the heated cooling medium 53 comprises heated air. As illustrated in FIG. 1, the heated cooling medium 53 (e.g. heated air) may be passed along to the dryer 13 for removing water from the moisture-containing carbonaceous feedstock 11. Alternatively, the cooling medium 52 may be any other thermally conductive fluid known to those skilled in the art. Preferably, the cooling medium 52 has a temperature of about 40° C. or less, and the heated cooling medium 53 has a temperature of about 125° C. or greater.

Figure 3:
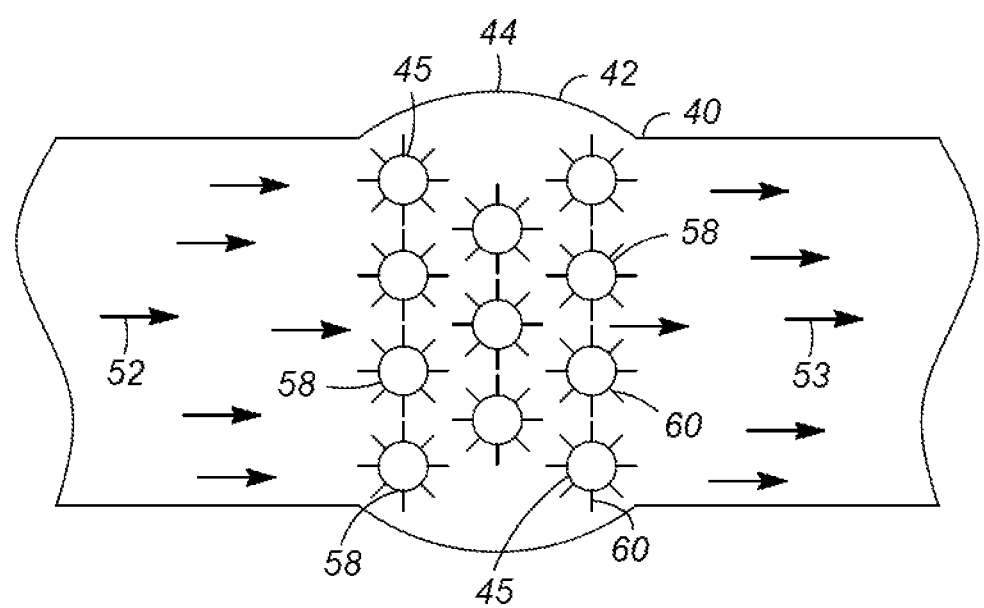
FIG. 3 is a sectional view of the inorganic particle cooler depicted in FIG. 2 along line 3-3.

Referring to FIG. 3, in an exemplary embodiment, the tube portion 45 comprises a plurality of tubes 58 that are juxtaposed, spaced apart, and longitudinally disposed substantially parallel to a vertical axis. Each of the tubes 58 has an outer surface with one or more cooling fins 60 that can extend, for example, radially or longitudinally outward from the outer surface. The cooling fins 60 facilitate indirect heat exchange between the portion of the heated inorganic particles 38 advancing through the tube portion 45 and the cooling medium 52 advancing through the shell portion 44.

As illustrated in FIG. 2, the partially-cooled heated inorganic particles 54 are removed from the exchanger vessel 42 and passed along a cooler standpipe 73. The cooler standpipe 73 has an expansion joint-slide valve 74 for controlling the flow rate of the partially-cooled heated inorganic particles 54. A lift riser 76 is downstream from the exchanger vessel 42 and is fluidly coupled to the cooler standpipe 73 for receiving the partially-cooled heated inorganic particles 54. Disposed in a lower portion 78 of the lift riser 76 is an air nozzle 80 that is configured to direct the partially-cooled heated inorganic particles 54 through the lift riser 76 to an upper portion 82 of the lift riser 76.

A sand-air distributor 84 is disposed in the reheater 14 and is fluidly coupled to the lift-riser 76 to receive the partially-cooled heated inorganic particles 54. The sand-air distributor 84 is configured to distribute the partially-cooled heated inorganic particles 54 in the reheater 14, preferably above the gas distributor 86, to partially cool the remaining portion of the heated inorganic particles and form the heated inorganic heat carrier particles 18. Referring also to FIG. 1, in exemplary embodiment, the heated inorganic heat carrier particles 18 have a temperature of from about 600 to about 780° C. and are passed along to the reactor 12 for rapidly pyrolyzing additional carbonaceous material.

Accordingly, apparatuses and methods for controlling heat for rapid thermal processing of carbonaceous material have been described. Unlike the prior art, the exemplary embodiments taught herein provide an apparatus comprising a reactor, a reheater, and an inorganic particle cooler. The reactor rapidly pyrolyzes a carbonaceous feedstock with heated inorganic particles to form pyrolysis oil and solids that include cooled inorganic heat carrier particles and char. The reheater receives the solids and fluidizes the cooled inorganic heat carrier particles and char with an oxygen-containing gas to form a fluidized bubbling bed. The reheater is operating at combustion conditions effective to burn the char into ash and heat the cooled inorganic heat carrier particles to form heated inorganic particles. The inorganic particle cooler receives a portion of the heated inorganic particles and removes some of the heat via indirect exchange to form partially-cooled heated inorganic particles that are combined with the remaining portion of the heated inorganic particles to partially cool the heated inorganic particles. It has been found that partially cooling the heated inorganic particles with the inorganic particle cooler facilitates controlling the temperatures from excessively rising in the reheater even if the fluidized bubbling bed contains higher levels of char. Accordingly, the reheater does not require additional volume that would otherwise be needed to accommodate additional air for cooling to control the reheater temperatures and therefore, the cost and complexity of shipping, installing, and operating the reheater is not substantially impacted.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention, it being understood that various changes may be made in the function and arrangement of elements described in an exemplary embodiment without departing from the scope of the invention as set forth in the appended Claims and their legal equivalents.

What is claimed is:

1. A method for controlling heat for rapid thermal processing of carbonaceous material, the method comprising the steps of:
   combining an oxygen-containing gas, inorganic heat carrier particles, and char at combustion conditions effective to burn the char into ash and heat the inorganic heat carrier particles to form heated inorganic particles;
   indirectly exchanging heat from a first portion of the heated inorganic particles to a cooling medium to form first partially-cooled heated inorganic particles and a heated cooling medium; and
   combining the first partially-cooled heated inorganic particles with a second portion of the heated inorganic particles to form second partially-cooled heated inorganic particles.

2. The method according to claim 1, wherein the step of combining the oxygen-containing gas, the inorganic heat carrier particles, and the char comprises forming the heated inorganic particles having a temperature of from about 600 to about 780° C.

3. The method according to claim 1, wherein the step of indirectly exchanging heat comprises forming the first partially-cooled heated inorganic particles having a temperature of from about 500 to about 680° C.

4. The method according to claim 1, wherein the step of combining the first partially-cooled heated inorganic particles with the second portion of the heated inorganic particles comprises forming the second partially-cooled heated inorganic particles having a temperature of from about 600 to about 780° C.

5. The method according to claim 1, wherein the step of indirectly exchanging heat comprises indirectly exchanging heat from the first portion of the heated inorganic particles to the cooling medium that has a temperature of about 40° C. or less.

6. The method according to claim 1, wherein the heated cooling medium has a temperature of about 125° C. or greater.

7. The method according to claim 1, wherein the heated cooling medium comprises heated air.

8. The method according to claim 7, further comprising the step of:
   removing water from the carbonaceous material with the heated air to form a water-depleted carbonaceous material.

9. The method according to claim 8, further comprising the step of:
   contacting the water-depleted carbonaceous material with the second partially-cooled heated inorganic particles to rapidly pyrolyze the water-depleted carbonaceous material.

10. The method according to claim 8, wherein the step of removing water comprises forming the water-depleted carbonaceous material having a water content of about 6 wt. % or less.

11. An apparatus for controlling heat for rapid thermal processing of carbonaceous material, the apparatus comprising:
    a reheater configured to contain a fluidized bubbling bed that comprises an oxygen-containing gas, inorganic heat carrier particles, and char and to operate at combustion conditions effective to burn the char into ash and heat the inorganic heat carrier particles to form heated inorganic particles;
    an inorganic particle cooler in fluid communication with the reheater to receive a first portion of the heated inorganic particles and configured to receive a cooling medium for indirect heat exchange with the first portion of the heated inorganic particles to form first partially-cooled heated inorganic particles and a heated cooling medium, wherein the reheater and the inorganic particle cooler are cooperatively configured to combine the first partially-cooled heated inorganic particles with a second portion of the heated inorganic particles in the reheater to form second partially-cooled heated inorganic particles; and
    a reactor in fluid communication with the reheater to receive the second partially-cooled heated inorganic particles.

12. The apparatus according to claim 1, wherein the cooling medium comprises air and the inorganic particle cooler is configured to indirectly exchange heat from the first portion of the heated inorganic particles to the cooling medium to form heated air, and wherein the apparatus further comprises a dryer that is in fluid communication with the inorganic particle cooler to receive the heated air, and wherein the dryer is configured to receive the carbonaceous material and to remove water from the carbonaceous material with the heated air to form a water-depleted carbonaceous material, and wherein the reactor is configured to receive the water-depleted carbonaceous material and to rapidly pyrolyze the water-depleted carbonaceous material with the second partially-cooled heated inorganic particles.

13. An apparatus for controlling heat for rapid thermal processing of carbonaceous material, the apparatus comprising:
    a reactor;
    a reheater in fluid communication with the reactor to receive inorganic heat carrier particles and char, wherein the reheater is configured to form a fluidized bubbling bed that comprises an oxygen-containing gas, the inorganic heat carrier particles, and the char and to operate at combustion conditions effective to burn the char into ash and heat the inorganic heat carrier particles to form heated inorganic particles; and
    an inorganic particle cooler in fluid communication with the reheater and comprising a shell portion and a tube portion that is disposed in the shell portion, wherein the inorganic particle cooler is configured such that the tube portion receives a portion of the heated inorganic particles and the shell portion receives a cooling medium for indirect heat exchange with the portion of the heated inorganic particles to form:
    (i) partially-cooled heated inorganic particles that are fluidly communicated to the reheater; and
    (ii) a heated cooling medium.

14. The apparatus according to claim 13, wherein the tube portion comprises a plurality of tubes each having an outer surface and at least one cooling fin that is disposed along the outer surface.

15. The apparatus according to claim 13, wherein the tube portion comprises a plurality of juxtaposed tubes that are spaced apart and longitudinally disposed substantially parallel to a vertical axis.

16. The apparatus according to claim 13, wherein the inorganic particle cooler comprises:
- an exchanger vessel comprising the shell and tube portions;
- a lift riser disposed downstream from the exchanger vessel; and
- a sand-air distributor disposed within the reheater downstream from the lift riser, and wherein the lift riser is configured to receive and fluidly communicate the partially-cooled heated inorganic particles to the sand-air distributor and the sand-air distributor is configured to distribute the partially-cooled heated inorganic particles in the reheater.

17. The apparatus according to claim 16, wherein the lift riser has a lower portion extending to an upper portion, the lower portion is configured to receive the partially-cooled heated inorganic particles and the upper portion is fluidly coupled to the sand-air distributor, and wherein the lift riser comprises an air nozzle that is positioned in the lower portion and that is configured to direct the partially-cooled heated inorganic particles through the lift riser from the lower portion to the upper portion for introduction to the sand-air distributor.

18. The apparatus according to claim 16, wherein the reheater has a lower section for containing the fluidized bubbling bed and comprises a gas distributor that is disposed in the lower section and that is configured to fluidly communicate the oxygen-containing gas to the fluidized bubbling bed, and wherein the sand-air distributor is disposed above the gas distributor.

19. The apparatus according to claim 18, wherein the inorganic particle cooler is fluidly coupled to the lower section of the reheater to receive the portion of the heated inorganic particles.

20. The apparatus according to claim 16, wherein the inorganic particle cooler further comprises at least one bubble breaking grating that is disposed upstream from the tube portion.

\* \* \* \* \*